(12) United States Patent
von Blücher et al.

(10) Patent No.: US 7,132,007 B1
(45) Date of Patent: Nov. 7, 2006

(54) AIR FILTER UNIT WITH SEVERAL FILTER ELEMENTS

(75) Inventors: Hasso von Blücher, Erkrath (DE);
Ludovic Ouvry, Düsseldorf (DE);
Stefan Kämper, Ratingen (DE);
Michael Moskopp, Schwalmtal (DE);
Ernest de Ruiter, Leverkusen (DE);
Bertram Böhringer, Wuppertal (DE)

(73) Assignee: Blücher GmbH, Erkrath (DE)

( * ) Notice: Subject to any disclaimer, the term of this patent is extended or adjusted under 35 U.S.C. 154(b) by 294 days.

(21) Appl. No.: 10/808,662

(22) Filed: Mar. 25, 2004

(30) Foreign Application Priority Data

Apr. 17, 2003 (DE) .............................. 103 18 054

(51) Int. Cl.
*B01D 53/02* (2006.01)
(52) U.S. Cl. .............................. 95/90; 95/273; 96/132; 96/135; 96/153; 96/154
(58) Field of Classification Search .................... 95/90, 95/273, 285; 96/121, 131, 132, 134, 135, 96/153, 154; 55/315, 318, 527
See application file for complete search history.

(56) References Cited

U.S. PATENT DOCUMENTS

| | | | |
|---|---|---|---|
| 3,849,332 A | 11/1974 | Bailey et al. | |
| 3,944,403 A * | 3/1976 | Simpson et al. | 96/131 |
| 4,236,902 A | 12/1980 | Fricke | |
| 4,510,193 A * | 4/1985 | Blucher et al. | 428/196 |
| 4,565,727 A * | 1/1986 | Giglia et al. | 428/172 |
| 5,486,410 A * | 1/1996 | Groeger et al. | 442/353 |
| 5,772,738 A * | 6/1998 | Muraoka | 96/129 |
| 5,871,569 A * | 2/1999 | Oehler et al. | 96/153 |
| 6,120,841 A | 9/2000 | Parmentier et al. | |
| 6,156,089 A * | 12/2000 | Stemmer et al. | 55/467 |
| 6,299,771 B1 * | 10/2001 | Shmidt et al. | 210/263 |
| 2002/0062740 A1 * | 5/2002 | Brukov et al. | 96/153 |
| 2002/0129711 A1 * | 9/2002 | Oda et al. | 96/134 |
| 2003/0032556 A1 | 2/2003 | Ouvry | |
| 2003/0089237 A1 * | 5/2003 | Jagtoyen et al. | 96/108 |
| 2003/0092560 A1 | 5/2003 | Von Blucher et al. | |
| 2004/0237790 A1 * | 12/2004 | von Blucher et al. | 96/154 |

FOREIGN PATENT DOCUMENTS

| | | |
|---|---|---|
| DE | 402 02 46 | 1/1992 |
| DE | 198 49 389 | 5/2000 |
| GB | 2 022 446 | 12/1979 |
| JP | 57171419 | 10/1982 |
| JP | 63 242341 | 10/1988 |
| JP | 06039238 | 2/1994 |
| JP | 2003 102818 | 4/2003 |
| JP | 2003-102818 A * | 4/2003 |

* cited by examiner

*Primary Examiner*—Frank M. Lawrence
(74) *Attorney, Agent, or Firm*—Cohen, Pontani, Lieberman & Pavane

(57) ABSTRACT

A filter unit for the purification of air includes at least a first filter element, which contains granular, especially spherical, activated carbon as an adsorbent material, and at least a second filter element, which contains a combination of granular, especially spherical, activated carbon and activated carbon fibers as an adsorbent material. The filter unit is suitable especially for use in ventilation plants, ventilation systems, air-conditioning systems and the like.

36 Claims, 2 Drawing Sheets

AIR FILTER UNIT WITH SEVERAL FILTER ELEMENTS

BACKGROUND OF THE INVENTION

1. Field of the Invention

The present invention concerns a filter unit, especially for purifying air, with a number of adsorbent filter elements, each of which contains activated carbon as the absorbent material.

2. Description of the Related Art

The present invention also concerns the use of this air purification filter unit, especially for producing high-purity air and for removing gaseous substances, foul-smelling substances, and toxic substances from air streams, for example, in ventilation plants, ventilation systems, air-conditioning systems, or the like.

Finally, the present invention concerns plants or systems, especially ventilation plants, ventilation systems, or air-conditioning systems, for purifying air or for producing or conditioning air with this filter unit.

The pollution of the environment by harmful substances has been receiving more and more public attention due to increasing environmental awareness and the availability of highly sensitive analytical methods.

Moreover, increasing industrialization has resulted in extensive pollution of the atmosphere. Every type of combustion process, e.g., in power plants, automobile engines, heating systems, etc., produces undesired combustion products, especially oxidized carbon compounds, nitrogen oxides, incompletely combusted hydrocarbons, and the like.

Other sources of harmful substances include contaminated rooms that contain building materials that contain harmful substances (e.g., building materials that contain PCB's, etc.). Toxic substances can also be released from pieces of furniture, wall paints, carpet adhesives, and the like.

In addition, there is now a growing danger of terrorist attacks involving the systematic introduction of toxic substances into the air-conditioning systems of buildings, subway ventilation systems, etc.

All together, therefore, there is a great need to remove a very wide variety of air pollutants from the air, especially harmful or annoying noxious substances, toxic substances, or foul-smelling substances. Many state-of-the-art methods are available for removing such substances. Examples that might be mentioned here include mechanical filtration methods, methods that involve the reaction or destruction of the annoying or harmful substances, and absorption and adsorption methods.

Adsorption methods involve the use of filter units that work by adsorption. The problem here is that the adsorption capacity of state-of-the-art filter units is often inadequate and thus relatively quickly exhausted, so that the filter materials have to be replaced. Furthermore, state-of-the-art adsorption filter units often lack sufficient "spontaneity" or adsorption kinetics, with the result that breakthroughs can occur. In addition, state-of-the-art adsorption filter units often have inadequate adsorption efficiency and are not universally suitable for the adsorption of a very wide variety of harmful and toxic substances.

SUMMARY OF THE INVENTION

Accordingly, the objective of the present invention is to make available a filter unit that is suited especially for the purification of air.

A further objective of the present invention is to make available a filter unit for purifying and conditioning air, which at least partially avoids the aforementioned problems of the state of the art. In particular, a filter unit of this type should have a sufficient adsorption or loading capacity for harmful, toxic, and foul-smelling substances to be adsorbed and at the same time should exhibit good breakthrough behavior.

The object of the present invention is thus a filter unit, especially for the purification of air, with (i) at least a first filter element, which contains granular, especially spherical, activated carbon as the adsorbent material, and (ii) at least a second filter element, which contains a combination of granular, especially spherical, activated carbon and activated carbon fibers as the adsorbent material.

The second filter element is preferably located downstream of the first filter element. This means that the first and second filter elements are arranged one after the other in the direction of flow of the air flowing into or towards the filter element, such that the air stream to be purified flows through the first filter element first.

To obtain a high adsorption efficiency and capacity and at the same time good breakthrough behavior of the filter unit of the invention, it is advantageous for the mean particle diameter of the granular activated carbon of the first filter element to be greater than the mean particle diameter of the granular activated carbon of the second filter element, generally by at least 0.05 mm, preferably by at least 0.1 mm, more preferably by at least 0.15 mm, even more preferably by at least 0.2 mm, and most preferably by at least 0.25 mm.

If necessary, to further increase the adsorption efficiency of the filter unit of the invention, in accordance with one embodiment of the present invention, at least one additional filter element, which contains granular, especially spherical, activated carbon as the adsorbent material, can be arranged or provided between the first filter element and the second filter element. Further details of this special embodiment of the present invention are described below with reference to an embodiment illustrated in the drawing.

Further advantages, characteristics, aspects, and features of the present invention are described below with reference to the preferred embodiment illustrated in the drawing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
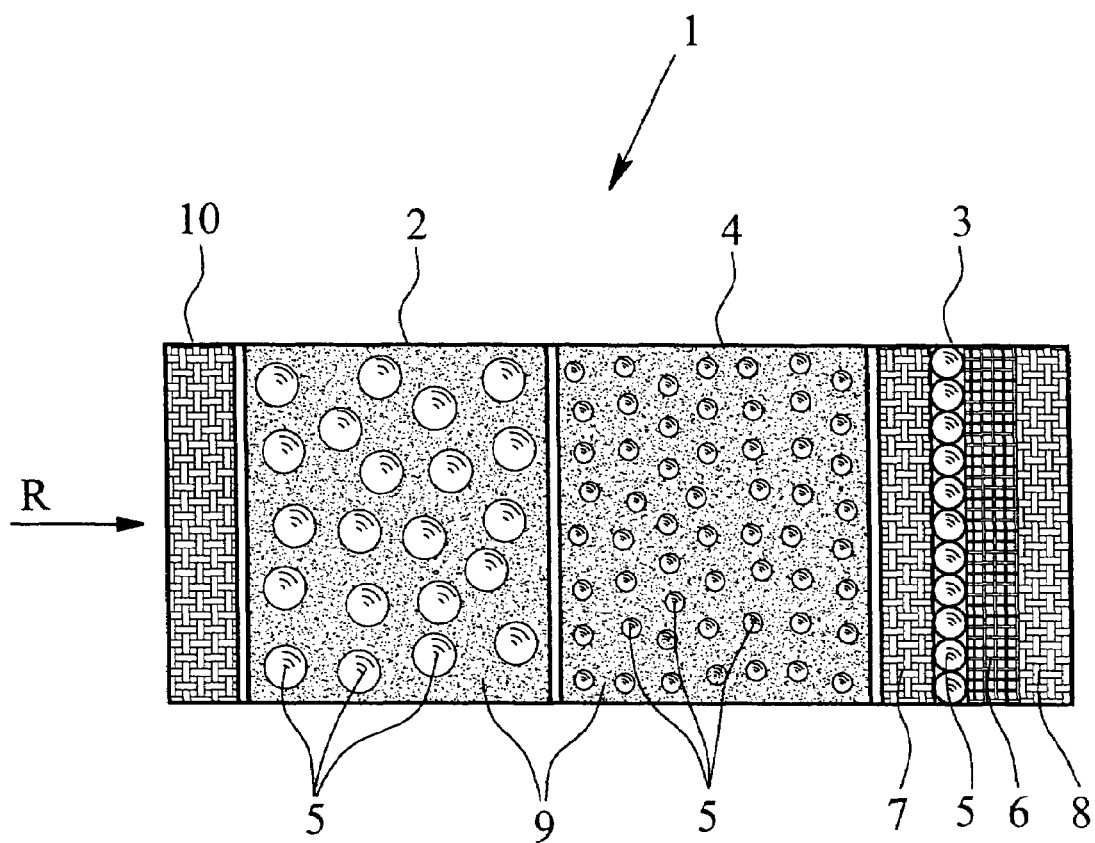
FIG. 1 is a schematic representation of a filter unit of the invention.

FIG. 1 shows a filter unit 1 with a number of adsorbent filter elements 2, 3, and 4, each of which contains adsorbents based on activated carbon as the adsorbent material, such that the filter unit 1 comprises (i) at least a first filter element 2, which contains granular, especially spherical, activated carbon 5 as the adsorbent material, (ii) at least one additional filter element 4, which contains granular, especially spherical, activated carbon 5 as the adsorbent material, and (iii) at least a second filter element 3, which contains a combination of granular, especially spherical, activated carbon 5 and activated carbon fibers 6 as the adsorbent material.

The filter elements 2, 3, and 4 are arranged one after the other in the filter unit 1 in the downstream order specified above. In other words, the filter elements 2, 3, and 4 are joined one after the other, especially in immediate succession, in the order specified above in the direction R of the air flowing into or towards the filter unit 1.

The filter elements 2, 3, and 4 may be preceded by a separating filter element 10 for separating solid particles, especially dust particles. In other words, the separating filter element 10 is arranged upstream of the filter elements 2, 3, and 4. The separating filter element 10 may be a textile material, especially a woven fabric, non-woven fabric, warp-knit fabric, layered fabric, matted fabric, fleece, felt, or other bonded fabric. The separating filter element 10 generally effects a purely mechanical separation of solid particles to prevent the filter elements 2, 3, and 4 that follow it from becoming clogged with solid particles. The separating filter element 10 is generally inert, i.e., it has no adsorptive properties whatsoever.

The granular activated carbon 5 of the first filter element 2 and/or the additional filter element 4, which is arranged between the first filter element 2 and the second filter element 3, may be present, for example, in the form of loose fill. The loose fill may be held together, for example, by suitable devices (e.g., webs or frames).

However, in accordance with the invention, the granular activated carbon 5 of the first filter element 2 and/or the additional filter element 4, which is arranged between the first filter element 2 and the second filter element 3, is preferably fixed, especially by adhesive bonding, in a three-dimensional, air-permeable support structure 9. An example of a suitable material that may be used as the three-dimensional support structure 9 is an open-cell foamed plastic, preferably a reticulated polyurethane (PU) foam, which is loaded with granular activated carbon 5. The expert is already familiar with the adhesive bonding itself. Examples of suitable adhesives for this purpose are moisture-crosslinking and/or heat-crosslinking, especially reactive (hot-melt) adhesives, preferably based on polyurethane. First, the foam is impregnated with the adhesive, then the excess adhesive is squeezed out, then the foam is loaded with the granular activated carbon 5, and, finally, a moisture treatment and/or heat treatment is carried out to crosslink the adhesive. If possible, the type and amount of adhesive should be planned in such a way that a large portion of the surface of the granular activated carbon 5 after the adhesive bonding is freely accessible to the harmful, toxic and foul-smelling substances to be adsorbed, i.e., not covered with adhesive, especially at least 40% of the surface of the activated carbon 5 should be freely accessible, preferably at least 50%, more preferably at least 60%, and most preferably at least 70% and more. However, it is also possible to use a foam material that becomes adhesive on heating, so that no additional adhesive is necessary in this embodiment. To obtain optimum loading of the cellular plastic with granular activated carbon 5, it is advantageous, if the mean cell diameter of the open-cell foamed plastic is at least twice as great, preferably at least two and a half times as great, and especially at least three times as great as the mean particle diameter of the granular activated carbon 5 of the first filter element 2 and/or the additional filter element 4 arranged between the first filter element 2 and the second filter element 3.

An especially good adsorption efficiency of the filter unit of the invention can be achieved, if the mean particle diameter of the granular activated carbon 5 of the first filter element 2 is greater than the mean particle diameter of the granular activated carbon 5 of the additional filter element 4 arranged between the first filter element 2 and the second filter element 3, preferably at least 0.05 mm greater, more preferably at least 0.1 mm greater, even more preferably at least 0.15 mm greater, especially preferably at least 0.2 mm greater, and most preferably at least 0.25 mm greater.

The advantage obtained by placing the filter element 2 with the more coarse-grained activated carbon before the filter element 4 with the more fine-grained activated carbon (with respect to the direction of flow of the inflowing air) is especially the following: The filter element 2 with the more coarse-grained activated carbon has a greater loading or adsorption capacity and thus captures a large portion of the substances to be adsorbed (about 90–95%); by contrast, although the filter element 4 with the more fine-grained activated carbon has a lower loading or adsorption capacity, it exhibits better adsorption kinetics, so that it can immediately adsorb the substances that possibly break through the first filter element 2. Since the amount of substances breaking through is relatively small, due to the fact that the substances to be adsorbed are already mostly adsorbed by the first filter element 2, the following filter element 4 can maintain its function as a filter element for adsorbing substances that break through the first filter element 2 for a long period of time, because its capacity for the adsorption of the relatively small amounts of substances breaking through is perfectly adequate.

The mean particle diameter of the granular activated carbon 5 of the first filter element 2 can vary within wide limits. In general, the mean particle diameter of the granular activated carbon 5 of the first filter element 2 is in the range of 0.5 to 1 mm, and is preferably at least 0.5 mm, more preferably at least 0.6 mm, and most preferably at least 0.65 mm.

The mean particle diameter of the granular activated carbon 5 of the additional filter element 4 arranged between the first filter element 2 and the second filter element 3 can likewise vary within wide limits. In general, the mean particle diameter of the granular activated carbon 5 of filter element 4 is in the range of 0.1–0.6 mm, preferably 0.2–0.6 mm, and more preferably 0.3–0.6 mm.

The mean particle diameter of the granular activated carbon 5 of the second filter element 3 can likewise vary within wide limits. In general, the mean particle diameter of the granular activated carbon 5 of the second filter element 3 is in the range of 0.05 to 1 mm, preferably 0.1–0.8 mm, and more preferably 0.1–0.6 mm.

The granular activated carbon 5 used in accordance with the invention can be produced by carbonization and subsequent activation of suitable organic starting materials in granular form, preferably spherical form. An example of a suitable polymer is polystyrene crosslinked with divinylbenzene. This material may be present, for example, in the form of ion exchangers (e.g., cation exchangers) or precursors of such ion exchangers. The starting materials may also consist, for example, of porous, especially macroporous, or even gel-like polymer pellets or granules. In addition, the starting materials may also consist, for example, of pitch pellets or granules. The expert is familiar with the production of granular or spherical activated carbon. The reader may refer, for example, to U.S. Pat. No. 4,510,193 and U.S. 2003/0092560, the contents of which are incorporated herein be reference, and H. v. Kienle and E. Bäder, *Aktivkohle und ihre industrielle Anwendung [Activated Carbon and Its Industrial Use]*, Ferdinand Enke Verlag, Stuttgart 1980.

The activated carbon fibers 6 used in accordance with the invention can be produced by carbonization and subsequent activation of suitable organic starting fibers, especially cellulose fibers, fibers based on cellulose derivatives, phenol resin fibers, polyvinyl alcohol fibers, pitch fibers, acrylic resin fibers, polyacrylonitrile fibers, aromatic polyamide fibers, formaldehyde resin fibers, divinylbenzene-crosslinked polystyrene fibers, lignin fibers, cotton fibers and hemp fibers. In accordance with the invention, the use of carbonized and activated fibers based on cellulose and cellulose derivatives is preferred. The expert is familiar with the production of activated carbon fibers of these types. In this regard, the reader may refer, for example, to U.S. Pat. No. 3,849,332, U.S. 2003/0032556, and U.S. Pat. No. 6,120,841 the entire contents of which are incorporated herein by reference, as well as to DE 195 19 869 A1 and DE 33 39 756 C2. Fibers that are especially preferred in accordance with the invention are obtained by the process specified in U.S. Pat. No. 6,120,841. In accordance with this process, a fiber structure from a carbon precursor material based on cellulose (e.g., rayon, floss silk, solvated celluloses, cotton, stem fibers) is impregnated with a composition that includes at least one mineral component (e.g., phosphoric acid, sulfuric acid, hydrochloric acid, etc.) that has a promotor effect for the dehydration of cellulose, and then the fiber structure that has been impregnated in this way is subjected to a heat treatment at a temperature that is sufficient to cause the conversion of the cellulose precursor essentially to carbon, such that the heat treatment, which is carried out in an inert or partially oxidizing atmosphere, comprises a stage in which the temperature is increased at a mean rate of 1–15° C./min and then a stage in which the temperature is maintained at 350–500° C., and is followed by a step in which residual phases of the impregnation composition and decomposition products of the cellulose material are removed by washing. The activated carbon fibers 6 used in accordance with the invention are preferably present in the form of an activated carbon fiber textile material, for example, woven fabrics, non-woven fabrics, warp-knit fabrics, layered fabrics, matted fabrics, fleeces, felts or other bonded fabrics. Preferred materials are nonwoven materials, such as fleeces, felts, layered fabrics (e.g., multidirectional layered fabrics), as well as woven fabrics. A nonwoven material that is preferred in accordance with the invention is formed, for example, in such a way that the activated carbon fibers (carbon fibers), together with thermoplastic, sticky bicomponent fibers, form an activated carbon fiber structure, in which the content of thermoplastic bicomponent fibers should not exceed 50 wt. %, based on the activated carbon fiber structure. Activated carbon fiber textile materials that may be used in accordance with the invention generally have a weight of 10–200 g/m$^2$, preferably 10–150 g/m$^2$, more preferably 10–120 g/m$^2$, even more preferably 20–100 g/m$^2$, and most preferably 25–80 g/m$^2$.

The activated carbon fibers 6 used in accordance with the invention have mean fiber diameters particularly in the range of 1–25 μm, preferably 2.5–20 μm, and more preferably 5–15 μm. Their length-specific weight (titer) is generally in the range of 1–10 dtex, and preferably 1–5 dtex.

In order to achieve an especially good adsorption efficiency, it may be advantageous for the mean particle diameter of the granular activated carbon 5 in the second filter element 3 to be greater than the mean fiber diameter of the activated carbon fibers 6 by a factor of at least three, preferably by a factor of at least four, more preferably by a factor of at least five, and most preferably by a factor of at least six.

In the second filter element 3, the granular activated carbon 5 and the activated carbon fibers 6 are generally present in layers that are separate but that border on each other or are permanently joined to each other, especially by adhesive bonding. In this way, the layer with the granular activated carbon 5 and the layer with the activated carbon fibers 6 can form a composite.

In accordance with a special embodiment of the present invention, in the second filter element 3, the granular activated carbon 5 and/or the activated carbon fibers 6 may be fixed, especially by adhesive bonding, on an air-permeable, preferably textile, support 7 and/or 8, respectively. A suitable textile support 7 and/or 8 is, for example, a textile cloth, such as a woven fabric, non-woven fabric, warp-knit fabric, layered fabric, matted fabric, fleece, felt, or other bonded fabric. The textile support 7 and/or 8 generally has a weight of 50–300 g/m$^2$, preferably 75–250 g/m$^2$, and more preferably 90–175 g/m$^2$.

In accordance with the invention, the use of activated carbon with a relatively large specific surface is preferred. In general, the granular activated carbon 5 and the activated carbon fibers 6 have a specific surface (BET method) of at least 800 m$^2$/g, preferably at least 900 m$^2$/g, and more preferably in the range of 800–1,500 m$^2$/g.

Depending on the application, it may be advantageous or necessary to furnish the adsorptive material, i.e., the granular activated carbon 5 and/or the activated carbon fibers 6 with an impregnation. For example, depending on the application and especially on the type and amount of the toxic, harmful, and/or foul-smelling substances to be adsorbed, different types of impregnation may be suitable. Examples of impregnations include impregnations based on metals and/or metal compounds, preferably selected from the group comprising copper, cadmium, silver, platinum, palladium, zinc, and mercury and their compounds, and/or acid or basic impregnations, especially based on phosphoric acid, potassium carbonate, trimethanolamine, 2-amino-1,3-propanediol, and sulfur or copper salts. The amount of impregnating agent can be adapted according to the application. In general, the amount of the impregnation agent(s), based on the impregnated activated carbon material, is 0.01 to 15 wt. %, preferably 0.05 to 12 wt. %, and more preferably 5–12 wt. %. The impregnation of activated carbon is well known from the state of the art. For further details, the reader may refer, for example, to the previously cited work, H. v. Kienle and E. Bäder, *Aktivkohle und ihre industrielle Anwendung [Activated Carbon and Its Industrial Use]*, Ferdinand Enke Verlag, Stuttgart 1980, and to DE 195 19 869 A1, DE 44 32 834 A1, and DE 44 47 844 A1.

Depending on the application, it may be advantageous to install measurement devices (e.g., sensors or probes) after some or all of the filter elements 2, 3, and/or 4, especially after the first filter element 2, which are sensitive to the substances to be adsorbed and in this way can indicate or detect breakthroughs. This makes it possible to determine by simple means whether the capacity of one or more of the filter elements 2, 3, and/or 4 is exhausted and thus whether it may be necessary to replace the affected filter element(s) 2, 3, and/or 4. This is especially important with respect to the first filter element 2, because this is the filter element that adsorbs the largest portion of the substances to be adsorbed, and, consequently, if the capacity of this particular filter element is exhausted, the following filter elements can be overloaded, or their capacity can be exhausted too quickly.

The filter unit of the invention is distinguished by its excellent adsorption efficiency, especially a high adsorption or loading capacity for harmful, toxic, and foul-smelling substances to be adsorbed, and at the same time by its excellent breakthrough behavior (no penetration of harmful, toxic, and foul-smelling substances to be adsorbed).

Due to the relatively nonspecific adsorption characteristics of the filter unit of the invention, it is suitable for the adsorption of any harmful, toxic, and foul-smelling substances and is thus universally usable.

In addition, the filter unit of the invention offers the advantage of good regeneration, so that recycling is readily possible.

An additional object of the present invention is the use of the filter unit of the invention for the purification of air, especially for the production of high-purity air and/or for the removal of gaseous, foul-smelling, and/or toxic substances of all types from air streams. In this regard, the filter unit of the invention is designed in such a way that the air to be purified flows through it.

For example, the filter unit of the invention can be used in ventilation plants, ventilation systems, or air-conditioning systems, especially for closed environments, such as buildings or the interiors of vehicles, such as motor vehicles, railway cars, transportation means of all types, and the like.

In this regard, the filter unit may be permanently connected into the system or only when needed, especially when gaseous, foul-smelling, and/or toxic substances are present or appear in the air streams to be purified, in the manner of a bypass, so to speak. The latter variant has the advantage that the adsorption efficiency of the filter unit is not unnecessarily burdened or overtaxed, so that a longer service life is achieved.

Figure 2:
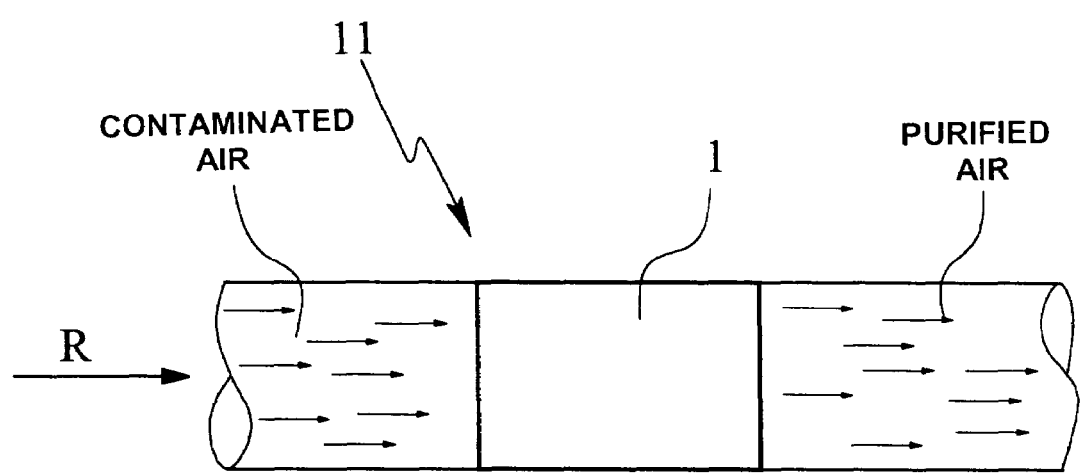
FIG. 2 is a schematic representation of an air purification system using a filter unit of the invention.

Finally, another object of the present invention is plants or systems for purifying air and/or for producing or conditioning air, especially ventilation plants, ventilation systems, or air-conditioning systems that contain a filter unit of the invention. A plant or system 11 of this type is shown schematically in FIG. 2.

Further advantages and further refinements, modifications and variations of the present invention can be immediately recognized and realized by an individual skilled in the art upon reading the specification without his exceeding the bounds of the present invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A filter unit for the purification of air, the filter unit comprising:
    a first filter element comprising granular activated carbon as an adsorbent material, and
    a second filter element comprising a combination of granular activated carbon and activated carbon fibers as an adsorbent material,
    wherein the mean particle diameter of the granular activated carbon of the first filter element is greater than the mean particle diameter of the granular activated carbon of the second filter element.

2. A filter unit as in claim 1 wherein the granular activated carbon is spherical activated carbon.

3. A filter unit as in claim 1 wherein the second filter element is arranged downstream of the first filter element.

4. A filter unit as in claim 1 wherein the mean particle diameter of the granular activated carbon of the first filter element is at least 0.05 mm greater than the mean particle diameter of the granular activated carbon of the second filter element.

5. A filter unit as in claim 1 wherein the mean particle diameter of the granular activated carbon of the first filter element is at least 0.2 mm greater than the mean particle diameter of the granular activated carbon of the second filter element.

6. A filter unit as in claim 1 wherein further comprising an additional filter element arranged between the first filter element and the second filter element, the additional filter element containing granular activated carbon as the adsorbent material.

7. A filter unit as in claim 1 wherein further comprising at least one separating filter element for separating solid particles preceding the first and second filter elements.

8. A filter unit as in claim 7 wherein the separating filter element is a textile material.

9. A filter unit as in claim 7 wherein the separating filter element effects purely mechanical separation of solid particles.

10. A filter unit as in claim 6 wherein the granular activated carbon of at least one of the first filter element and the additional filter element is present in the form of loose fill.

11. A filter unit as in claim 6 wherein the granular activated carbon of at least one of the first filter element and the additional filter element is fixed in a three-dimensional, air-permeable support structure.

12. A filter unit as in claim 11 wherein the three-dimensional support structure is an open-cell foamed plastic.

13. A filter unit as in claim 12 wherein the mean cell diameter of the open-cell foamed plastic is at least twice as great as the mean particle diameter of the granular activated carbon of the at least one of the first filter element and the additional filter element.

14. A filter unit as in claim 6 wherein the mean particle diameter of the granular activated carbon of the first filter element is greater than the mean particle diameter of the granular activated carbon of the additional filter element.

15. A filter unit as in claim 14 wherein the mean particle diameter of the granular activated carbon of the first filter element is at least 0.05 mm greater than the mean particle diameter of the granular activated carbon of the additional filter element.

16. A filter unit as in claim 15 wherein the mean particle diameter of the granular activated carbon of the first filter element is at least 0.2 mm greater than the mean particle diameter of the granular activated carbon of the additional filter element.

17. A filter unit as in claim 1 wherein the granular activated carbon is produced by carbonization and subsequent activation of suitable organic starting materials in granular form.

18. A filter unit in as in claim 1 wherein the activated carbon fibers are produced by carbonization and subsequent activation of suitable organic starting fibers.

19. A filter unit as in claim 18 wherein the starting fibers are selected from among the groups of cellulose fibers, fibers based on cellulose derivatives, phenol resin fibers, polyvinyl alcohol fibers, pitch fibers, acrylic resin fibers, polyacrylonitrile fibers, aromatic polyamide fibers, formaldehyde resin fibers, divinylbenzene-crosslinked polystyrene fibers, lignin fibers, cotton fibers and/or hemp fibers.

20. A filter unit as in claim 1 wherein the activated carbon fibers are present in the form of an activated carbon fiber textile material.

21. A filter unit as in claim 1 wherein the activated carbon fibers have mean fiber diameters of 1–25 μm.

22. A filter unit as in claim 1 wherein the activated carbon fibers have a length-specific weight (titer) of 1–10 dtex.

23. A filter unit as in claim 1 wherein the mean particle diameter of the granular activated carbon in the second filter element is at least three times greater than the mean fiber diameter of the activated carbon fibers.

24. A filter unit as in claim 1 wherein the granular activated carbon and the activated carbon fibers in the second filter element are arranged in layers that are separate but that border on each other and/or are permanently joined to each other.

25. A filter unit as in claim 1 wherein at least one of the granular activated carbon and the activated carbon fibers in the second filter element are fixed on an air-permeable support.

26. A filter unit as in claim 1 wherein at least one of the granular activated carbon and the activated carbon fibers have a specific surface (BET) of at least 800 $m^2/g$ and up to 1,500 $m^2/g$.

27. A filter unit as in claim 1 wherein at least one of the granular activated carbon and the activated carbon fibers are impregnated with an impregnation.

28. A filter unit as in claim 27 wherein the impregnation is based on at least one of metals and metal compounds selected from the group comprising copper, cadmium, silver, platinum, palladium, zinc, and mercury, and their compounds.

29. A filter unit as in claim 27 wherein the impregnation is one of an acid and a basic impregnation.

30. A filter unit in as in claim 27 wherein said impregnation comprises an impregnating agent which is 0.01 to 15 wt. % of the amount of impregnated activated carbon material.

31. A filter unit for the purification of air, the filter unit comprising:
a first filter element comprising granular activated carbon as an adsorbent material,
an additional filter element comprising granular activated carbon as an adsorbent material, and
a second filter element comprising granular activated carbon and activated carbon fibers as an adsorbent material,
wherein the mean particle diameter of the granular activated carbon of the first filter element is greater than the mean particle diameter of the granular activated carbon of the second filter element.

32. A filter unit as in claim 31 wherein the filter elements are arranged one after the other in a downstream as follows: the first filter element, the additional filter element, and the second filter element.

33. A method of purifying air, comprising:
providing a filter unit including a first filter element comprising granular activated carbon as an adsorbent material, a second filter element comprising a combination granular activated carbon and activated carbon fibers as an adsorbent material, and an additional filter element comprising granular activated carbon as an adsorbent material arranged between the first filter element and the second filter element,
wherein the mean particle diameter of the granular activated carbon of the first filter element is greater than the mean particle diameter of the granular activated carbon of the second filter element; and
flowing air to be purified through the filter unit.

34. A filter unit as in claim 1 wherein the granular activated carbon and the activated carbon fibers have a specific BET surface of at least 800 $m^2/g$.

35. A filter unit for the purification of air, the filter unit comprising:
a first filter element comprising granular activated carbon as an adsorbent material;
a second filter element comprising a combination of granular activated carbon and activated carbon fibers as an adsorbent material; and
an additional filter element arranged between the first filter element and second filter element, the additional filter element containing granular activated carbon as the adsorbent material, the mean particle diameter of the granular activated carbon of the first filter element being greater than the mean particle diameter of the granular activated carbon of the additional filter element.

36. A filter unit for the purification of air, the filter unit comprising:
a first filter element comprising granular activated carbon as an adsorbent material;
an additional filter element comprising granular activated carbon as an adsorbent material, and
a second filter element comprising granular activated carbon and activated carbon fibers as an adsorbent material,
wherein the filter elements are arranged one after the other in a downstream as follows:
the first filter element, the additional filter element, and the second filter element.

* * * * *